Oct. 26, 1954   H. B. WILSON   2,692,439
GAUGE
Filed July 31, 1953   3 Sheets-Sheet 1

INVENTOR.
HERMAN B. WILSON
BY Thos. L. Donnelly
ATTORNEY.

Oct. 26, 1954
H. B. WILSON
2,692,439
GAUGE
Filed July 31, 1953
3 Sheets-Sheet 2
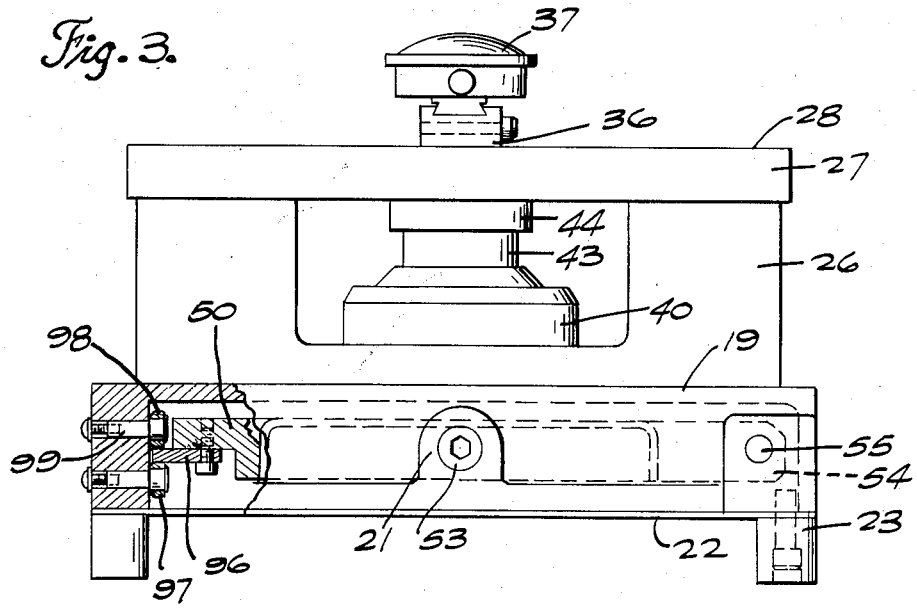
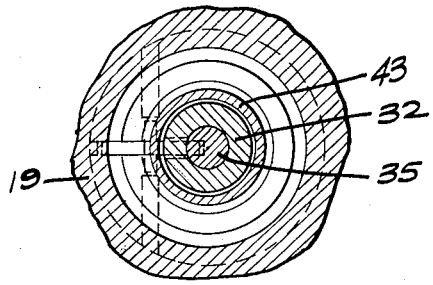
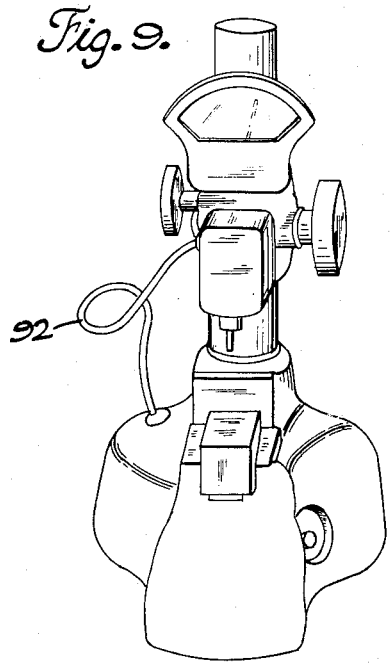
INVENTOR.
HERMAN B. WILSON
BY
Thos. S. Donnelly
ATTORNEY.

Oct. 26, 1954  H. B. WILSON  2,692,439
GAUGE
Filed July 31, 1953  3 Sheets-Sheet 3
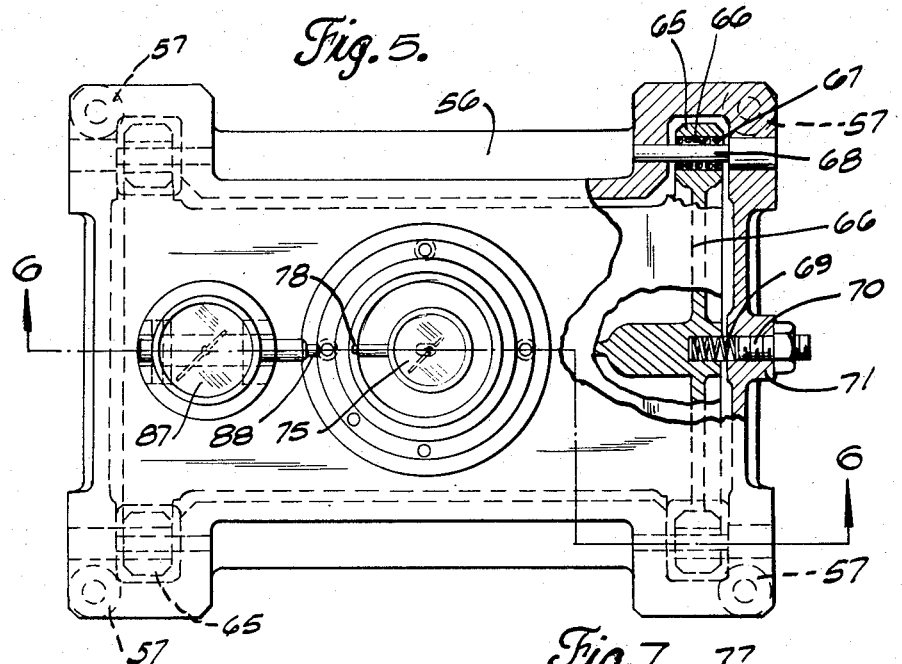
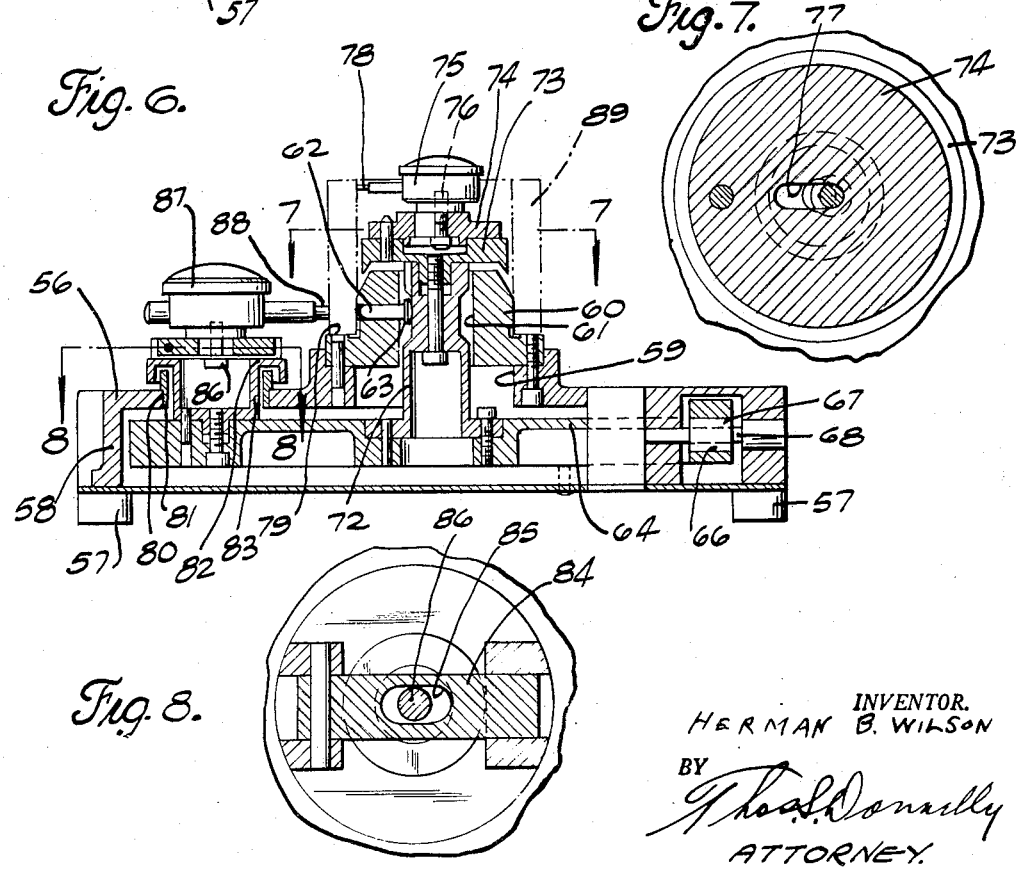
INVENTOR.
HERMAN B. WILSON
BY
Thos. S. Donnelly
ATTORNEY.

Patented Oct. 26, 1954

2,692,439

UNITED STATES PATENT OFFICE 2,692,439

GAUGE

Herman B. Wilson, Detroit, Mich.

Application July 31, 1953, Serial No. 371,552

9 Claims. (Cl. 33—172)

My invention relates to a new and useful improvement in a gage adapted for checking the concentricity of a surface of a bore with the periphery of the material through which the bore is formed. The gage is also used to check the squareness of the axis of the bore relatively to an end face shoulder or flange of the work piece.

It is an object of the present invention to provide a gage mechanism of this class in which the axial tilting of the work piece is avoided.

Another object of the invention is the provision of a gage of this class so constructed and arranged that the work pieces may be easily and quickly placed in position for checking and removed therefrom.

Another object of the invention is the provision of a mechanism having a contact member for contacting the surface of the bore and cooperating with indicators all of which move bodily and to the same degree and in the same direction as the bodily movement of the contacting member.

Another object of the invention is the provision in a gage mechanism of this class of a movable supporting body movable in response to a contacting member which contacts the inner surface of the bore and which carries indicators contacting outer surfaces of the work piece so that the indicators will move in the same direction and to the same extent as the contacting member.

Another object of the invention is the provision of a contacting member which engages the surface of the bore to be checked and the point of contact of which is always in the same relationship to the axis of the bore.

Another object of the invention is the provision of a gage of this class having a supporting arbor over which the bore of the work piece is to be placed and provided with a longitudinally moved contact member projecting through the arbor and adapted for engaging a supporting member which supports indicators engaging the surface of the bore and the periphery of the work piece so that upon longitudinal movement of the contact member the indicators will be moved in the same direction and to the same degree, thus maintaining a constant relation between the indicators and the axis of the bore.

Another object of the invention is the provision in a gage of this class of a mechanism having a movable supporting member which carries indicators and so moved as to guarantee the accuracy of the indicator dials and maintain a constant axial relationship between the indicator contact members and the axis of the bore.

Another object of the invention is the provision of a gage having a movable supporting member carrying an indicator for engaging the periphery of the work piece and moved in response to a thrust delivered thereto by a contact member engaging the surface of the bore and which lies with its axis in the same plane as the axis of the indicator contact member.

Other objects will appear hereinafter.

It is recognized that various modifications and changes may be made in the details of structure illustrated without departing from the invention and it is intended that the present disclosure shall be considered but the preferred embodiment of the invention.

Forming a part of this application are drawings in which,

Fig. 3 is an elevational view of the invention with a part broken away and taken on line 3—3 of Fig. 1.

Fig. 4 is a fragmentary sectional view taken on line 4—4 of Fig. 2.

Fig. 5 is a top plan view of the modification with parts broken away and parts shown in section.

Fig. 6 is a sectional view taken on line 6—6 of Fig. 5.

Fig. 7 is a sectional view taken on line 7—7 of Fig. 6.

Fig. 8 is a fragmentary sectional view taken on line 8—8 of Fig. 6.

Fig. 9 is a fragmentary view illustrating a slight modification.

Figure 1:
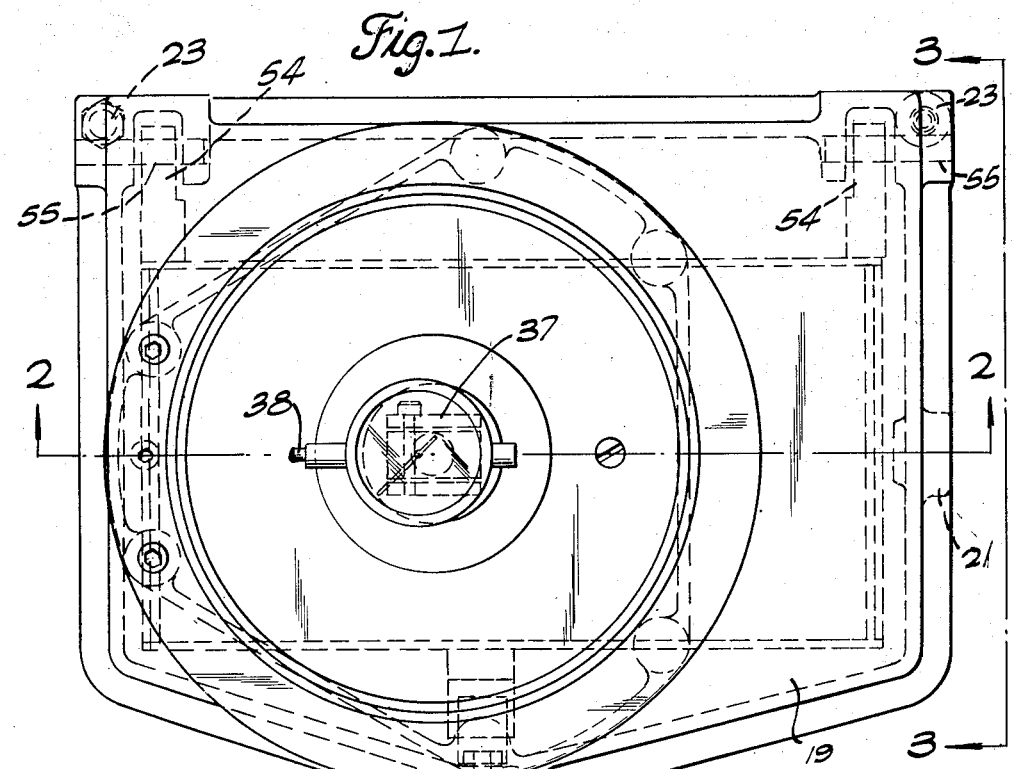
Fig. 1 is a top plan view of the invention.

In the form in Fig. 1, I use a base 19 having a depending flange 20 on each of the sides thereof. On one of these flanges is formed a boss 21. A closure plate 22 is mounted on the bottom of the flanges and adjustable supporting legs 23 thread into the flanges. The base 19 is cut away to provide an opening 24. Mounted on the base 19 by means of screws 25 is a support 26 which serves to support the contact ring 27 having an upper contact base 28 on which a base 29 of a work piece 30 may be rested. This support 26 is also cut away to provide an opening 31. Projected through this opening 31 is an indicator supporting member 32 having on its lower end a head 33 which projects into a frame 34, surrounding the opening 34b, this frame being larger than the head 33 so that there is a clearance between the inner surface of the frame 34 and the perimeter of the head 33 as clearly shown in Fig. 2. Secured in and projecting upwardly from the support 32 is a stud 35 on which is mounted a slide 36 which serves to support an indicator 37 having a contact stem 38 projecting outwardly therefrom. When the member 35 is removed from the member 32 there is a clear passage through the member 32 and by providing the opening 34b, the dirt and foreign material will pass therethrough, so that it will not have access to the working parts of the invention.

In the work piece 30 is formed a recess or socket 39 and the mechanism is illustrated as used for determining the squareness of the face 29 with the axes of socket 39 and bore 42.

Figure 2:
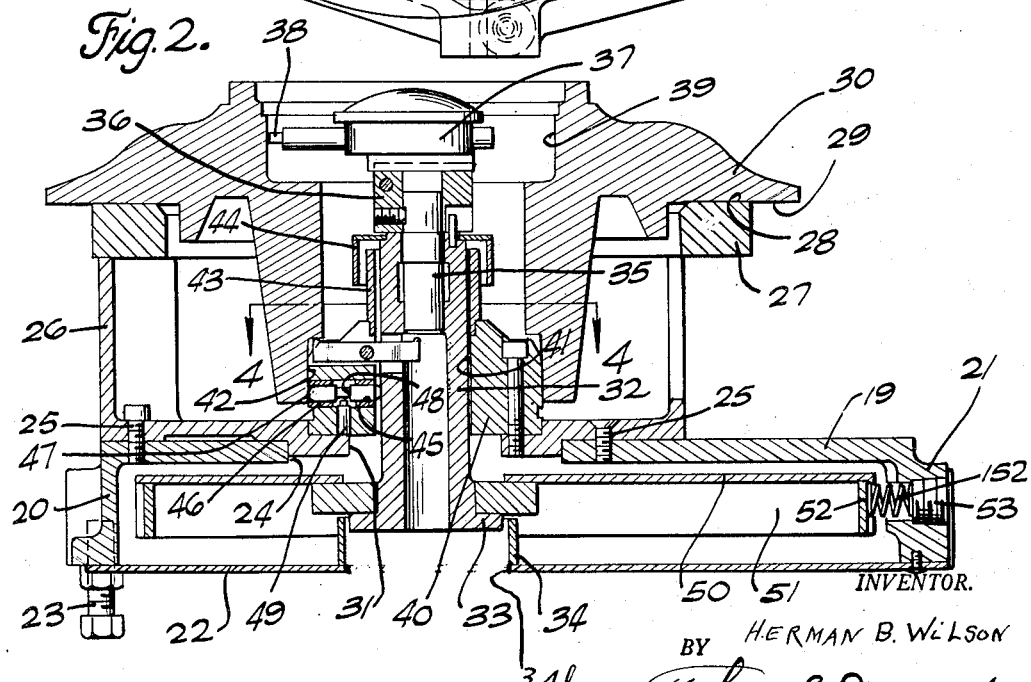
Fig. 2 is a fragmentary sectional view taken on line 2—2 of Fig. 1.

Mounted on the support 26 and projecting upwardly therefrom is an arbor 40 having a passage 41 formed therethrough through which the supporting member 32 projects. As shown in Fig. 2 there is a clearance between the periphery of the supporting member 32 and the passage 41 so that the supporting member 32 may, within certain limits, move diametrically of the passage 41. The work piece 30 is illustrated as provided with a bore or recess 42 which sits over the arbor 40. This arbor 40 is made to fit the various types of work piece which are to be tested and the diameter of the arbor 40 is slightly smaller, perhaps .005 or .002 of an inch, than the minimum inside diameter of the bore 42. Thus the work piece may move radially of the arbor within the limits established. Projecting upwardly from the arbor 40 is a sleeve 43 with which telescopes an inverted cup 44 which serves as a shield for preventing dust or foreign particles from entering the bore 41 of the arbor.

Formed in this arbor 40 is a passage 45 in which is positioned a bushing 46, and slideable in this bushing is a plunger or stud 47 having a groove 48 formed in its periphery in which engages the end of a stop pin 49 which is mounted in the arbor 40. This pin or stud 47 engages at one end the face of the bore 42 of the work piece and at the opposite end the periphery of the supporting member 32.

A movable platform 50 is mounted on the head 33 by means of the bars 51. A flange 52 projects downwardly from the platform 50 at each side thereof. Engaging one of the sides is one end of a coil spring 152, the other end of which engages a plug 53, mounted in the boss 21 so as to normally maintain the platform 50 moved to the left of Fig. 2. This platform is provided with the brackets 54 through each of which extends a pin 55 fixedly mounted on the platform 19 so that the platform 50 is thus floatingly mounted beneath the platform 19.

It will be noted that the brackets 54 extend outwardly from one side of the platform 50, which is the top side in Fig. 1. This platform is provided at its lower side with an outwardly projecting supporting plate 96 which engages between the rollers 97 and 98, and which is supported thereby. These rollers are carried by the bolts 99. It will be noted, as shown in Fig. 3, that the plate 96 is spaced at its free edge from the downwardly projecting portion of the stationary platform 19. This arrangement is resorted to so that in the event it is desired to form the platform 19 and platform 50 out of different metals, which would differ in their thermal coefficient of expansion, there would be no binding between the various parts and the platform 50 would still be possessed of the characteristic of free uninterfered-with movement.

In use, the workpiece is placed in position as shown in Fig. 2, and then may be rotated by hand. It is to be kept in mind that the bore 42 is larger than the outside diameter of the arbor 40 so that in rotating the workpiece the workpiece may be moved or jostled within the limits of the clearance. Regardless of this movement of the workpiece the indicator 37 will truly indicate because, for instance, in Fig. 2 if the workpiece is moved slightly to the right the platform 50 will be moved in the same direction, the same distance. This movement would be effected through engagement of the stud 47 with the surface of the bore 42. Should the workpiece be moved to the left the platform 50 would follow up due to the action of the spring 152. Thus the indicator is always maintained in the same relationship to the axis of the bore.

In the structure shown in Fig. 5 is provided a stationary platform 56 having supporting legs 57 mounted on the depending flanges 58 which depend from the platform 56. This stationary platform is cut away to provide the opening 59, and mounted on this platform is an arbor 60 having a passage 61 formed therethrough. Slideably projected through the arbor 60 is a stud 62 having a head 63 projecting into the passage 61 of the arbor. Slideably mounted on and positioned beneath the platform 56 is a movable platform 64 having at its four corners, as shown in Fig. 5, the outwardly projecting arms 65 in each of which is formed a passage 66 carrying ball bushings 67 through which extends the pin 68 mounted in the stationary platform 56. A coiled spring 69 bears at one end against the end face of an adjusting screw 70 threaded through the boss 71 on the stationary platform. The construction is such that the spring 69 serves to tend to maintain the movable platform moved to the left of Fig. 5. Movement of this movable platform, relative to the stationary platform, to the right of Fig. 7 would be against the compression of the spring 69.

Mounted on this movable platform 64 and projecting upwardly therefrom is an indicator supporting member 72 on which is mounted a shield 73 which overlies the arbor 60 and serves as a protection against entry of foreign material into the passage 61. Mounted on this shield 73 is a plate 74 on which is mounted an indicator housing 75 by means of the screw 76 which engages in the elongated slot 77 formed in the plate 74 and which serves to fixedly mount the indicator housing 75 on the plate 74 and thus maintain this indicator housing 75 in fixed relation to the supporting member 72. Extending outwardly from the indicator housing is the contact finger 78.

The arbor is provided with a bearing surface 79 which establishes a plane extending parallel to the movable platform 64 and normal to the axis of the supporting member 72.

The stationary platform 56 is cut away to provide an opening 80 in which is pressed a sleeve 81 positioned within the inverted cup-shaped shield 82 which forms a part of the cup 83 which is mounted on and projects upwardly from the movable platform 64. Carried by this member 83 is a bar 84 having a slot 85 forward therein through which extends a screw 86 which serves to mount the indicator housing 87 thereon. Projecting outwardly from this indicator housing 87 is a contact finger 88. This contact finger lies with its axis in a plane parallel to the plane of the movable platform 64 and normal to the axis of the passage or bore 61. This, of course, would be normal to the periphery of the arbor 60. This contact finger 88 lies with its axis in the same plane as the axis of the stud 62 and preferably in alignment therewith.

In Fig. 6 I have indicated a cylindrical work piece 89 which is seated over the arbor 60 and rests with its lower end face upon the contact surface 79. This arbor is made slightly smaller than the inside diameter of the cylindrical work piece 89 so that there may be a slight radial play between the work piece and the arbor. When the work piece 89 is placed in position it may be rotated by hand on the arbor 60 and any eccentricity will be indicated by movement of the indicating finger 88 to register on the dial in the dial housing 87. In this movement the movable platform will move in response to a thrust delivered in one direction through the stud 62 and in the opposite direction through the spring 69 so that the dial indicators are all moving in the same direction and to the same degree as the stud contact member 62. Should the lower face of the cylindrical work piece 89 be formed at an angle to the axis of the work piece 60, this angularity or tilt would be indicated by the indicator 75 operating in response to the movement of the contact finger 78.

Experience has shown that in checking for eccentricity or concentricity on work pieces the present structure performs most efficiently and permits a rapid operation. Moreover, due to the fact that the indicator dials are all maintained with a constant axial relationship to the axis of the bore to be tested and consequently to the face to be tested which extends normal to the axis of the bore, the result is that absolute accuracy is obtained in testing in this manner and a considerable saving of time in the operation is accomplished.

In Fig. 9 I have shown a slight modification in which the type of dial indicated in the other figures has been replaced by an electrically-operated indicating dial, the cable 92 leading from the contact member to the dial face. Since this is a structure well known, it is believed that no further detail is necessary.

Electrically operated or pneumatic amplifiers of any standard make may be used instead of the mechanical indicators shown.

What I claim is:

1. A gage for testing the concentricity of a bore formed in a work piece, comprising: a stationary arbor for projection into a bore of the work piece, said arbor having a passage formed therethrough; an indicator supporting member extended through said passage; an indicator contact member carried by said supporting member and engageable with the inner surface of said bore at a point in spaced relation to the location of said arbor; a stud slidably projected through said arbor and engageable at one end with the surface of the bore of the work piece and at its opposite end with said supporting member; a base for supporting said arbor; a platform for supporting said supporting member and movably mounted on said base and movable in one direction in response to thrust delivered to said supporting member by said stud; a spring for moving said platform in the opposite direction, said arbor having a supporting surface upon which a face of the work piece may engage said supporting surface lying in a plane normal to the longitudinal axis of said arbor.

2. A gage for testing the concentricity of a bore formed in a work piece, comprising: a stationary arbor for projection into a bore of the work piece, said arbor having a passage formed therethrough; an indicator supporting member extended through said passage; an indicator contact member carried by said supporting member and engageable with the inner surface of said bore at a point in spaced relation to the location of said arbor; a stud slidably projected through said arbor and engageable at one end with the surface of the bore of the work piece and at its opposite end with said supporting member; a base for supporting said arbor; a platform for supporting said supporting member and movably mounted on said base and movable in one direction in response to thrust delivered to said supporting member by said stud; a spring for moving said platform in the opposite direction, said arbor having a supporting surface upon which a face of the work piece may engage, said supporting surface lying in a plane normal to the longitudinal axis of said arbor, and an indicator contact member carried by said platform lying with its longitudinal axis in the same plane as the longitudinal axis of said stud and engaging, in said plane, the periphery of the work piece, said work piece being rotatable on said arbor.

3. A gage of the class described adapted for determining the concentricity of a work piece having a bore therein, comprising: a supporting base; a stationary arbor on said base, said work piece having a passage for reception of said arbor and said work piece being rotatable on said arbor; a movable platform movably mounted on said base; a stud slidably projected through a passage in said arbor formed radially thereof, said arbor having a passage formed therethrough and said stud at one end projecting into said passage and at its opposite end beyond the periphery of said arbor; an indicator supporting member mounted on said platform and projecting into the passage of said arbor and engageable at its periphery with the end of said stud, said platform being movable in one direction by spring means and in the opposite direction by thrust delivered through said stud, the outer end of said stud engaging the surface of the passage in said work piece in which said arbor engages.

4. A gage of the class described adapted for determining the concentricity of a work piece having a bore therein, comprising: a supporting base; a stationary arbor on said base, said work piece being rotatable on said arbor; a movable platform movably mounted on said base; a stud slidably projected through a passage in said arbor formed radially thereof, said arbor having a passage formed therethrough and said stud at one end projecting into said passage and at its opposite end beyond the periphery of said arbor; an indicator supporting member mounted on said platform and projecting into the passage of said arbor and engageable at its periphery with the end of said stud, said platform being movable in one direction by spring means and in the opposite direction by thrust delivered through said stud, the outer end of said stud engaging the surface of the passage in said work piece in which said arbor engages, said stud lying with its longitudinal axis in a plane normal to the longitudinal aixs of said arbor.

5. A gage of the class described, comprising: a stationary base; an arbor fixedly mounted on and projecting upwardly from said base and adapted for insertion in a passage formed in a work piece for rotatably supporting said work piece; a stationary planar surface supported by said base and engageable with a planar face of the work piece, said supporting surface lying in a plane normal to the longitudinal axis of said arbor; a movable platform movably mounted on said base; a spring means for moving said platform in one direction and resisting movement of the same in the opposite direction; an indicator supporting member mounted on said platform and projected through a bore formed centrally in said arbor; a longitudinally movable stud mounted in said arbor and movable radially thereof and having its inner end extending into the passage in said arbor into engagement with said supporting member and its outer end projecting beyond the periphery of said arbor into engagement with the work piece, said movable platform being movable against the compression of said spring in response to thrust delivered to said supporting member by said stud; and an indicator contact member engaging the face of a bore formed in said work piece.

6. A gage of the class described, comprising: a stationary base; an arbor fixedly mounted on and projecting upwardly from said base and adapted for insertion in a passage formed in a work piece for rotatably supporting said work piece; a stationary planar surface supported by said base and engageable with a planar face of the work piece, said supporting surface lying in a plane normal to the longitudinal axis of said arbor; a movable platform movably mounted on said base; a spring means for moving said platform in one direction and resisting movement of the same in the opposite direction; an indicator supporting member mounted on said platform and projected through a bore formed centrally in said arbor; a longitudinally movable stud mounted in said arbor and movable radially thereof and having its inner end extending into the passage in said arbor into engagement with said supporting member and its outer end projecting beyond the periphery of said arbor into engagement with the work piece, said movable platform being movable against the compression of said spring in response to thrust delivered to said supporting member by said stud; and an indicator contact member engaging the face of a bore formed in said work piece; and a stationary supporting surface carried by said base, lying in a plane normal to the axis of said arbor, for engaging a surface of said work piece during the rotation of said work piece on said arbor.

7. A gage of the class described, comprising: a stationary base; an arbor mounted fixedly on said base and projecting upwardly therefrom adapted for insertion into a passage formed in a work piece and having a central bore formed therethrough; a platform movably mounted on said base; a spring for moving said platform in one direction; a stud slidably projected through a radially formed passage in said arbor and extending at its inner end into the passage through said arbor and at its outer end beyond the periphery of said arbor; an indicator supporting member fixedly mounted on said platform and extended through the passage in said arbor and engageable at its periphery with the inner end of said stud, said platform being movable in one direction through a thrust delivered to said supporting member by said stud, the outer end of said stud engaging the surface of a work piece rotatably mounted in embracing relation on said arbor; and an indicator contact member carried by said supporting member and engaging the surface of a bore in the work piece, said indicator contact member lying with its longitudinal axis in a plane parallel to a plane in which lies the longitudinal axis of said stud, said planes being normal to the longitudinal axis of the passage through said arbor.

8. A gage of the class described, comprising: a stationary base; an arbor mounted fixedly on said base and projecting upwardly therefrom adapted for insertion into a passage formed in a work piece and having a central bore formed therethrough; a platform movably mounted on said base; a spring for moving said platform in one direction; a stud slidably projected through a radially formed passage in said arbor and extending at its inner end into the passage through said arbor and at its outer end beyond the periphery of said arbor; an indicator supporting member fixedly mounted on said platform and extended through the passage in said arbor and engageable at its periphery with the inner end of said stud, said platform being movable in one direction through a thrust delivered to said supporting member by said stud, the outer end of said stud engaging the surface of a work piece rotatably mounted in embracing relation on said arbor; an indicator contact member carried by said supporting member and engaging the surface of a bore in the work piece, said indicator contact member lying with its longitudinal axis in a plane parallel to a plane in which lies the longitudinal axis of said stud, said planes being normal to the longitudinal axis of the passage through said arbor; and an indicator carried by said platform and movable in unison therewith and having a contact member engaging the periphery of the work piece on said arbor.

9. A gage of the class described, comprising: a stationary base; an arbor mounted fixedly on said base and projecting upwardly therefrom adapted for insertion into a passage formed in a work piece and having a central bore formed therethrough; a platform movably mounted on said base; a spring for moving said platform in one direction; a stud slidably projected through a radially formed passage in said arbor and extending at its inner end into the passage through said arbor and at its outer end beyond the periphery of said arbor; an indicator supporting member fixedly mounted on said platform and extended through the passage in said arbor and engageable at its periphery with the inner end of said stud, said platform being movable in one direction through a thrust delivered to said supporting member by said stud, the outer end of said stud engaging the surface of a work piece rotatably mounted in embracing relation on said arbor; an indicator contact member carried by said supporting member and engaging the surface of a bore in the work piece, said indicator contact member lying with its longitudinal axis in a plane parallel to a plane in which lies the longitudinal axis of said stud, said planes being normal to the longitudinal axis of the passage through said arbor; an indicator carried by said platform and movable in unison therewith and having a contact member engaging the periphery of the work piece on said arbor; and a planar supporting surface fixedly mounted on said base and engageable with a planar surface on the work piece during the rotation of the work piece relatively to said arbor, said supporting surface lying in a plane normal to the longitudinal axis of the passage in said arbor.

No references cited.